United States Patent
Jang

(10) Patent No.: US 9,576,365 B2
(45) Date of Patent: Feb. 21, 2017

(54) CAMERA ALIGNMENT METHOD USING CORRESPONDENCE BETWEEN MULTI-IMAGES

(71) Applicant: Electronics and Telecommunications Research Institute, Daejeon (KR)

(72) Inventor: Kyung Ho Jang, Daegu (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 225 days.

(21) Appl. No.: 14/446,281

(22) Filed: Jul. 29, 2014

(65) Prior Publication Data
US 2015/0237330 A1    Aug. 20, 2015

(30) Foreign Application Priority Data

Feb. 18, 2014    (KR) .................. 10-2014-0018541

(51) Int. Cl.
H04N 13/02    (2006.01)
G06T 7/00    (2006.01)

(52) U.S. Cl.
CPC .......... *G06T 7/0042* (2013.01); *G06T 7/0071* (2013.01); *G06T 2207/10021* (2013.01); *G06T 2207/20072* (2013.01); *G06T 2207/30232* (2013.01); *G06T 2207/30244* (2013.01)

(58) Field of Classification Search
None
See application file for complete search history.

(56) References Cited

U.S. PATENT DOCUMENTS

| 7,308,115 | B2 | 12/2007 | Zhang et al. | |
|---|---|---|---|---|
| 7,313,285 | B2 * | 12/2007 | Aliaga | G06T 9/20 375/E7.03 |
| 7,908,106 | B2 | 3/2011 | Cho | |
| 9,036,044 | B1 * | 5/2015 | Bae | G06T 7/0028 348/207.99 |
| 2012/0300979 | A1 * | 11/2012 | Pirchheim | G06T 7/2033 382/103 |

OTHER PUBLICATIONS

Marc Pollefeys et al., "Visual modeling with a hand-held camera", Internation Journal of Computer Vison, 2004, pp. 1-37, vol. 53.3.

* cited by examiner

*Primary Examiner* — Andy Rao
*Assistant Examiner* — Tyler Edwards

(57) ABSTRACT

Provided is a method of aligning a camera using correspondence information between multi-images. The camera alignment method using correspondences between multi-images includes defining a correspondence relation between images photographed in the multi-camera system, estimating an initial position of the camera using the correspondence relation between the images and a Structure From Motion (SFM) algorithm, redefining a changed correspondence relation between the images as a result of the estimation of the initial position of the camera using a bundle edge to generate an optimal edge, and correcting the position of the camera based on the optimal edge.

14 Claims, 4 Drawing Sheets

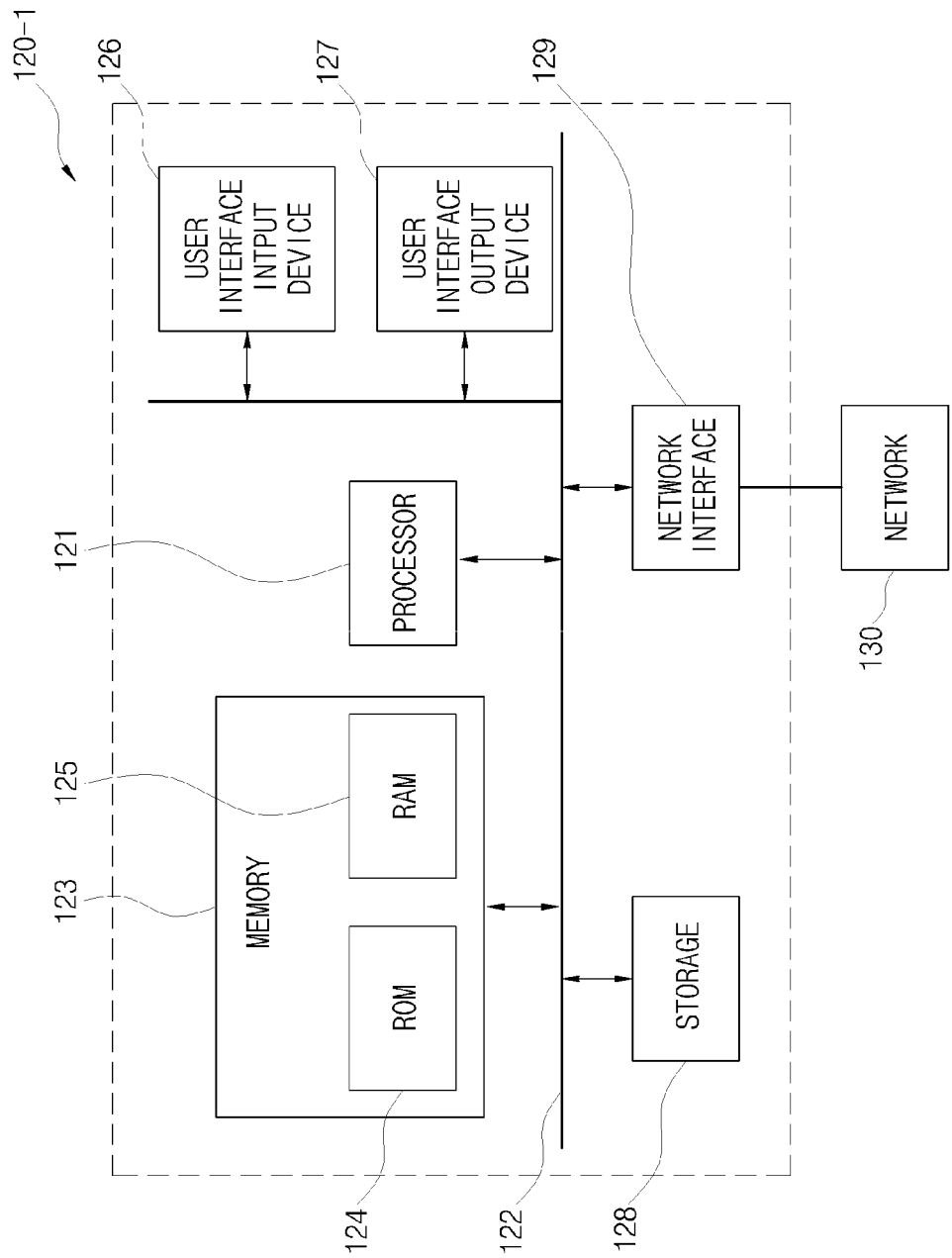

CAMERA ALIGNMENT METHOD USING CORRESPONDENCE BETWEEN MULTI-IMAGES

CROSS-REFERENCE TO RELATED APPLICATIONS

This application claims priority under 35 U.S.C. §119 to Korean Patent Application No. 10-2014-0018541, filed on Feb. 18, 2014, the disclosure of which is incorporated herein by reference in its entirety.

TECHNICAL FIELD

The present invention relates to a method of aligning a camera in a multi-image photographing system including multiple cameras, and more particularly, to a method of aligning a camera using correspondence information between multi-images.

BACKGROUND

A technology for correcting a position of a camera for each of given input images is one of important matters of concern in a computer vision field. To this end, an order of images should be defined first.

Most researchers correct a position of a camera by acquiring images in a predetermined direction to arbitrarily give an order of the images, or using a video camera having a predetermined order of images.

A method of defining an order of images using a video camera includes extracting all frames from a photographed video to extract only important frames for estimating position information about the camera, thereby removing unnecessary frames.

Sainz automatically gives an order of the images by extracting, as a subset, an image needed for camera correction from a photographed video image using information about feature points. Nister corrects a position of a camera by defining a partial image sequence for camera correction using three frames, extracting the partial image sequence using correspondences, giving an order to the partial image sequence. However, these methods simply intend to remove duplicate images because the order is predetermined upon photographing, and thus are difficult to apply to a snap image photographed at any position. In addition, since a camera is corrected using only a feature relation between adjacent images, an error may be accumulated during camera correction.

As another method, a user may directly decide an order of images. In this case, the user should review all images one by one and designate the order of the images. However, this method requires tremendous effort and time, and also it is quite difficult for the user to define the order of images.

SUMMARY

Accordingly, the present invention provides a camera alignment method that can minimize points that actually have had a correspondence relation using a correspondence between multi-images but lose the correspondence relation due to the camera correction.

In one general aspect, a method of aligning a position of a camera in a multi-camera system photographing multi-images, the method includes: defining a correspondence relation between images photographed in the multi-camera system; estimating an initial position of the camera using the correspondence relation between the images and a Structure From Motion (SFM) algorithm; redefining a changed correspondence relation between the images as a result of the estimation of the initial position of the camera using a bundle edge to generate an optimal edge; and correcting the position of the camera based on the optimal edge.

The defining of a correspondence relation may include defining each image as a vertex and generating a graph representing a relation between the images as an edge.

The defining of a correspondence relation may include extracting feature points from a first image and a second image, comparing the feature point of the first image with the feature point of the second image to calculate the number of valid correspondences; and if the number of valid correspondences is greater than a preset threshold, generating an edge between the first image and the second image.

The generating of the optimal edge may include: connecting a bundle edge such that the first vertex and the second vertex have a correspondence relation when the edge between the first vertex and the second vertex defined in the graph is broken as a result of the estimation of the initial position of the camera; calculating a three-dimensional point shared by points for the images including the first vertex and the second vertex having the correspondence relation; projecting the three-dimensional point onto the images to calculate a two-dimensional point; and if a sum of an euclidean distance between the two-dimensional point calculated in each image and the two-dimensional point existing on each image is equal to or less than a preset threshold, generating an optimal edge including the bundle edge.

The generating of the optimal edge may include: connecting a bundle edge such that the first vertex and the second vertex have a correspondence relation when the edge between the first vertex and the second vertex defined in the graph is not connected as a result of the estimation of the initial position of the camera; calculating a three-dimensional point shared by points for the images including the first vertex and the second vertex having the correspondence relation; projecting the three-dimensional point onto the images to calculate a two-dimensional point; and if a sum of an euclidean distance between the two-dimensional point calculated in each image and the two-dimensional point existing on each image is greater than a preset threshold, generating an optimal edge excluding the bundle edge.

The correcting of the position of the camera may include: (a) calculating at least one three-dimensional point shared by vertexes connected to the optimal edge; (b) calculating camera parameter information for each image using the three-dimensional point; (c) calculating a sum of an euclidean distance between the two-dimensional point obtained by projecting the three-dimensional point onto each image and the two-dimensional point existing on each image using the camera parameter information; and (d) recursively performing operations (a) to (c) until the sum of the euclidean distance is equal to or less than the preset threshold.

In another general aspect, an apparatus for aligning a position of a camera in a multi-camera system photographing multi-images, the apparatus includes: at least one processor and a non-volatile memory configured to store a code executed by the processor, wherein the processor is implemented to define a correspondence relation between images photographed in the multi-camera system; estimate an initial position of the camera using the correspondence relation between the images and a Structure From Motion (SFM) algorithm; redefine a changed correspondence relation between the images as a result of the estimation of the initial position of the camera using a bundle edge to generate an optimal edge; and correcting the position of the camera based on the optimal edge.

Other features and aspects will be apparent from the following detailed description, the drawings, and the claims.

BRIEF DESCRIPTION OF THE DRAWINGS

FIG. 6 is a view showing a configuration of a computer device for performing a camera alignment method using a correspondence between multi-images according to an embodiment of the present invention.

DETAILED DESCRIPTION OF EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
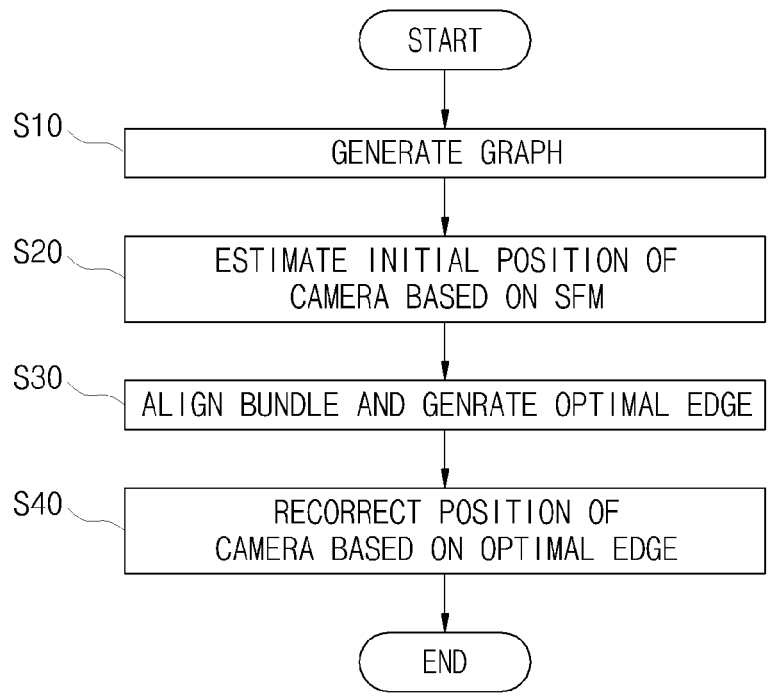
FIG. 1 is a view showing a camera alignment method using a correspondence between multi-images according to an embodiment of the present invention.

FIG. 1 is a view showing a camera alignment method using a correspondence between multi-images according to an embodiment of the present invention.

As shown in FIG. 1, a camera alignment method using a correspondence between multi-images according to an embodiment of the present invention includes generating a graph using a correspondence between multi-images in operation S10, estimating an initial position of a camera based on an SFM in operation S20, aligning a bundle and generating an optimal edge in operation S30, and recorrecting a position of the camera on the basis of an optimal edge in operation S40.

A process performed for each operation in order to optimize a position of the camera will be described in detail below with reference to the accompanying drawings. Here, the multi-images mean images obtained by photographing the same object or subject at different multi-views. When a three-dimensional image is reconstructed using the multi-images (two-dimensional images), a two-dimensional point of one two-dimensional image and a two-dimensional point of another two-dimensional image may correspond to the same three-dimensional point in an actual three-dimensional stereoscopic image. As such, there is a correspondence relation between the multi-images, and thus disclosed is a method of correcting or aligning positions of cameras that are positioned at different positions using the correspondence relation.

Operation S10 of generating a graph—definition of an adjacency graph illustrating a relation between multi-images.

The graph includes a vertex and an edge. The edge indicates a relation between two vertexes. If two vertexes satisfy a predefined relation condition, there is an edge between two vertexes. In addition, if the edge has directionality in the graph, the graph is referred to as a directed graph. The graph may define a weight for representing additional information about a relation between two vertexes with respect to an edge representing a relation between two vertexes, and the graph is referred to as a weighed graph.

An adjacency graph defined in the present invention defines each image using vertexes and represents a relation between images defined by epipolar geometry using edges. For example, an edge of the adjacency graph has directionality, and the directionality indicates a correspondence relation between the images. In addition, a vertex is defined as a node in the adjacency graph, and the node may have an identification number and a feature point for each image and a correspondence relation between the images. The adjacency graph may be configured based on the number of valid correspondences between any two nodes in each image.

For example, it is assumed that N multi-images are given. Correspondences are found by comparing each image with N−1 other images. In this case, when the number of correspondences is greater than a reference, the correspondences between the two images determined to be valid.

Figure 2:
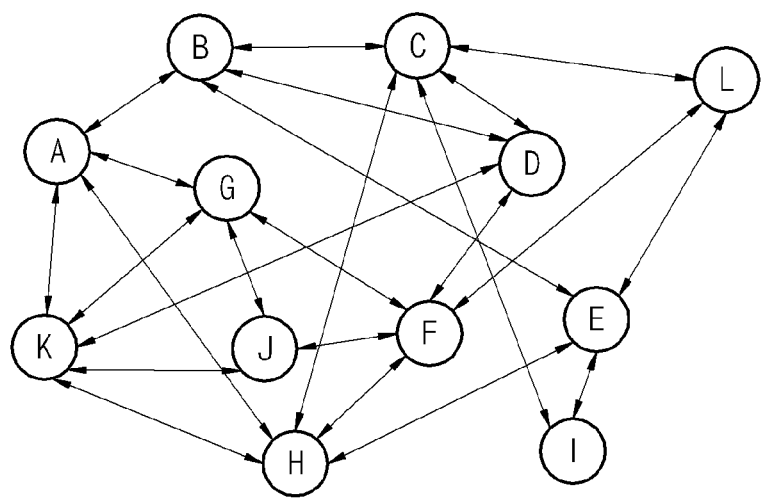
FIG. 2 is a view showing an example of a correspondence relation between multi-images, which is represented as a graph, according to an embodiment of the present invention.

This relation may represent a graph, and the result is illustrated in FIG. 2. However, though not shown in FIG. 2, as described above, a weight representing additional information (for example, the number of correspondences) about a relation between two vertexes may be represented together.

Operation S20 of estimating an initial position of a camera on the basis of SFM

Figure 3:
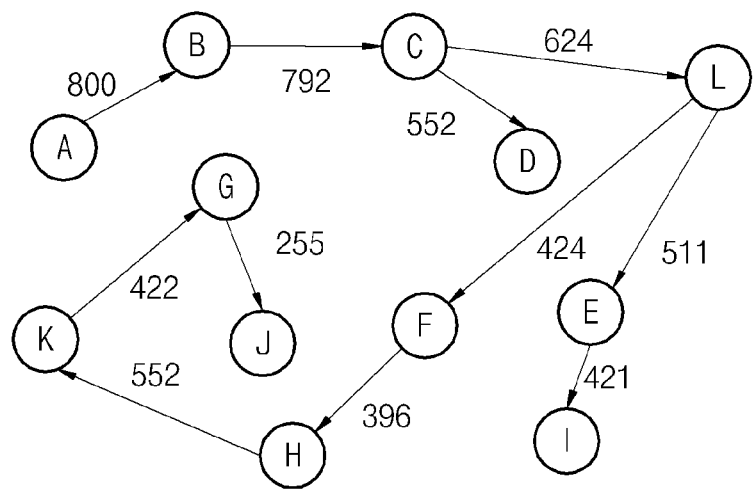
FIG. 3 is a view showing an example of a correspondence relation between multi-images that is initially estimated using an SFM algorithm, which is represented as a graph, according to an embodiment of the present invention.

In operation S10, the Structure From Motion (SFM) algorithm is used to estimate an initial position of a camera in an adjacency graph between multi-images generated in operation S10. A result thereof is illustrated in FIG. 3.

When images having a determined order having a determined order are used as inputs, the SFM algorithm estimates position information of a camera photographing the images, and estimates a three-dimensional point corresponding to the image to reconstruct a scene.

For example, if it is assumed that two images and three-dimensional points are initially defined, a correspondence between the two-dimensional point and the three-dimensional point in a next input image is used to directly estimate the position information about a camera photographing the image.

In addition, if position information about a camera photographing the image is estimated in a new input image, coordinate information about a three-dimensional point appearing in the image may be estimated. If the number of images to be input is N, the described-above process is iteratively performed until the position information of the camera is estimated for each of all images.

However, the SFM algorithm returns more accurate position tracking result as the number of accurate correspondences is greater. Accordingly, it is necessary to find a route having a greatest number of correspondences between two images in order to apply the SFM algorithm. A correspondence relation between images in this route is defined as an SFN edge. That is, the SFM edge indicates route information between images used to apply the SFM algorithm to estimate a position of a camera.

Operation S30 of aligning a bundle and generating an optimal edge.

In operation S20, the above-described SFM based camera position estimation is based on only a relation between images. This process considers a relation between only one pair of images. Accordingly, jitter may occur, which an error for image alignment becomes greater whenever calculation is performed and an image is added. In order to minimize the error propagation, bundle adjustment using a bundle edge in which correspondence relations between all cameras and all images are defined is needed to be performed.

The points actually having a correspondence relation between multi-images may be recognized as a noise to lose the correspondence relation due to the camera correction. In this case, if the bundle adjustment is performed, one three-dimensional point is recognized as two or more three-dimensional points to cause reduction in efficiency of the bundle adjustment. Therefore, the correspondence relation between images is needed to be redefined. As a result, when a two-dimensional correspondence relation is broken due to camera correction, or when a two-dimensional correspondence relation is broken because points acquired by projecting one three-dimensional point onto each image do not appear consecutively, the one three-dimensional point should be prevented from being represented as two or more points. An image realignment process for this will be illustrated as shown in FIGS. 4 and 5.

Figure 4:
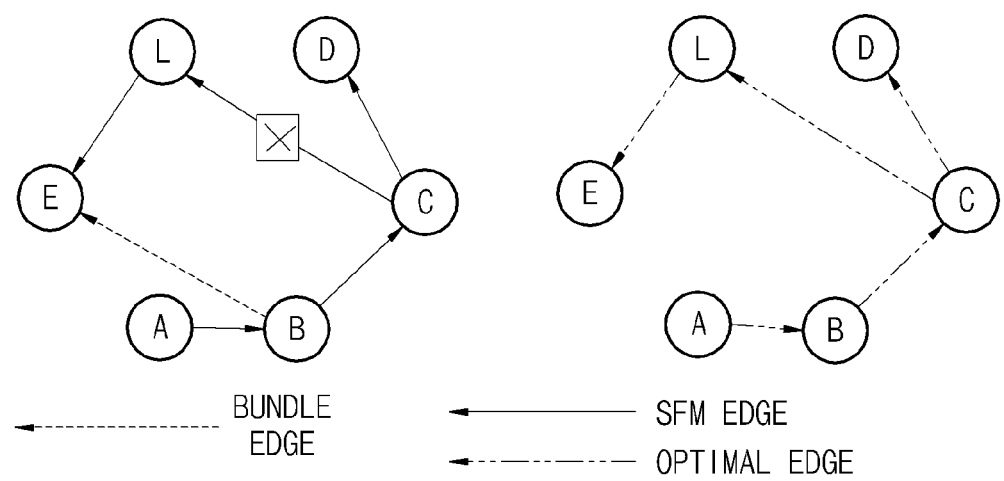
FIG. 4 is a view showing a situation in which an SFM edge is disconnected by the camera correction according to an embodiment of the present invention.
Figure 5:
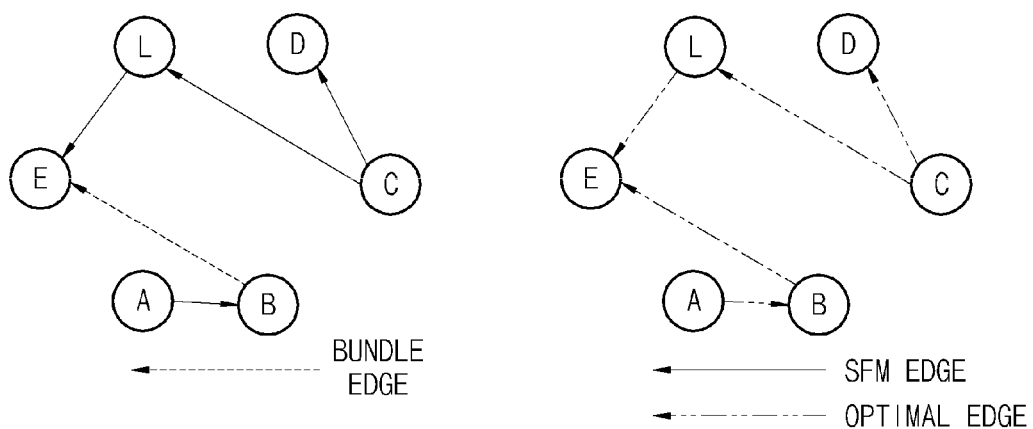
FIG. 5 is a view illustrating a case in which the correspondence between images appears not on an SFN edge, but on a bundle edge.

As shown in FIG. 4, there has been an SFM edge component between an image C and an image L, and the SFM edge component is broken due to the camera correction. Thus it can be seen that there are two three-dimensional points, such as a three-dimensional point calculated from images L and E and a three-dimensional point calculated from images A, B, C, and D. In this case, an SFM edge connection between the images C and L may be true or false. In order to determine whether the SFM edge connection is true or false, the bundle edge is utilized. Here, the bundle edge is used as a bundle adjustment route, which may simultaneously optimize information about all camera and all points in a three-dimensional space after performing the SFM.

In more detail, in order to optimize a position of a camera, a bundle edge is connected between images B and E. That is, images A, B, C, D, E, and L are regarded as sharing one point, and in consideration of this, camera information and correspondences are calculated and a three-dimensional point is calculated using the calculated camera information and correspondences. The three-dimensional point is projected onto a two-dimensional image. If a sum of euclidean distances between a two-dimensional point calculated by projection and an original two-dimensional point (see Equation (1)) is equal to or less than a reference value, the SFM connection between images C and L is determined as true.

If the sum of euclidean distances is greater than the reference value, the SFM connection between images C and L is determined as false. FIG. 4 shows a case in which the SFM connection between images C and L is true. Finally, an optimal edge including an SFM connection between images C and L is generated between multi-images. However, though not shown in FIG. 4, if the SFM connection between the images C and L is false, two group (a group of L and E and a group of A, B, C, and D) connected to the optimal edge is generated.

$$\sum_{i=0}^{n}(\hat{x}_i - P_i X)^2 \qquad (1)$$

where $$x = P\begin{bmatrix} X \\ 1 \end{bmatrix} \quad P = \kappa[R \mid T],$$

Pi is an i-th camera projection matrix, X is a three-dimensional point, and $\hat{x}_i$ is a two-dimensional point of an i-th image.

FIG. 5 shows a case in which a correspondence appears not on the SFM edge by the bundle edge. As shown in FIG. 5, a correspondence relation between images A and B is defined, and a correspondence relation between images C, D, L, and E is defined. In order to check whether the current correspondence relation between the images is true of false, a bundle edge is connected between images B and E. That is, images A, B, C, D, E, and L are regarded as sharing one point, and in consideration of this, camera information and correspondences are calculated and a three-dimensional point is calculated using the calculated camera information and correspondences. The three-dimensional point is projected onto a two-dimensional image. If a sum of euclidean distances between a two-dimensional point calculated by projection and an original two-dimensional point (see Equation (1)) is equal to or less than a reference value, a bundle edge connection between images B and E is determined as true. In this case, an optimal edge is generated including a bundle edge connection between images B and E. However, though not shown in FIG. 5, if a bundle edge connection between images B and E is false, two groups will be generated: one optimal edge will be generated between images A and B and the other optimal edge is generated between images C, D, L, and E.

Operation S40 of recorrecting a position of a camera on the basis of an optimal edge.

The method of redefining a relation between two-dimensional images in operation S30 has been described in detail. As a result, the two-dimensional images are connected to the optimal edge, and in operation S40, a process of recalculating location information of the camera is performed using the optimal edge.

In detail description, first, a three-dimensional point is calculated using all vertexes connected to the optimal edge. In this case, a linear equation such as Equation (2) may be used.

$$u_i = \frac{m_{00}X + m_{01}Y + m_{02}Z + m_{03}}{m_{20}Y + m_{21}Y + m_{22}Z + 1} \qquad (2)$$

$$v_i = \frac{m_{10}X + m_{11}Y + m_{12}Z + m_{13}}{m_{20}X + m_{21}Y + m_{22}Z + 1}$$

where $$P = \begin{bmatrix} m_{00} & m_{01} & m_{02} & m_{03} \\ m_{10} & m_{11} & m_{12} & m_{13} \\ m_{20} & m_{21} & m_{22} & 1 \end{bmatrix}$$

is a camera matrix, (X, Y, Z) is a three-dimensional point, and (ui, vi) is a two-dimensional point for each vertex.

Then camera parameter information in each two-dimensional image is calculated, as shown in Equation (3), on the basis of the three-dimensional point calculated from each two-dimensional image.

$$\hat{u}_{ij} = f(K, R_j, t_j, x_i)$$

$$\hat{v}_{ij} = g(K, R_j, t_j, x_i) \qquad (3)$$

where $\hat{u}_{ij}$ is an X-axis coordinate value of a two-dimensional point of a j-th image corresponding to an i-th three-dimensional point, K is internal parameter information of a camera, R is rotation information of the j-th image, t is position information of the j-th image, and $x_i$ is an i-th three-dimensional point.

In this case, information about K, R, and t is found such that a difference between $\hat{u}_{ij}$ and $f(K,R_j,t_j,x_i)$ may be minimized.

The above-described process is iteratively performed, and if the difference between $\hat{u}_{ij}$ and $f(K,R_j,t_j,x_i)$ less than a predefined reference or there is no recognized change, the optimization of operation S40 is completed.

$$\sum_{j}^{m} \sum_{i=0}^{n} (\hat{x}_{ij} - P_i X_j)^2 \qquad (4)$$

where Pi is an i-th camera projection matrix, $X_j$ is a j-th three-dimensional point, and $\hat{x}_{ij}$ is a two-dimensional point of a j-th image corresponding to an i-th three-dimensional point.

The camera alignment method using correspondences between multi-images according to an embodiment of the present invention may be implemented in a computer system or recorded on a recording medium. As shown in FIG. 6, a computer system may include at least one processor 121, a memory 123, a user input device 126, a data communication bus 126, a user output device 127, and a storage 128. The above-described elements communicate data through a data communication bus 122.

The computer system may further include a network interface 129 coupled to a network. The processor 121 may be a central processing unit (CPU), or a semiconductor device processing an instruction stored in the memory 123 and/or the storage 128.

The memory 123 and the storage 128 may include a variety of volatile or non-volatile storage media. For example, the memory 123 may include a ROM 124 and a RAM 125.

The camera alignment method using correspondences between multi-images according to an embodiment of the present invention may be implemented in a method executable in a computer. When the camera alignment method using correspondences between multi-images according to an embodiment of the present invention is performed in a computer device, instructions readable by the computer may perform an alignment method according to the present invention.

According to the present invention, in an operation of optimizing the camera correction, it is advantageously possible to minimize a phenomenon that one three-dimensional point is represented as several three-dimensional points and maximize optimization of a camera.

The camera alignment method using correspondences between multi-images according to the present invention can also be implemented as computer readable codes on a computer readable recording medium. The computer readable recording medium includes all kinds of recording device for storing data which can be thereafter read by a computer system. Examples of the computer readable recording medium may include a read only memory (ROM), a random access memory (RAM), a magnetic disk, a flash memory, an optical data storage device, etc. The computer readable recording medium can also be distributed over computer systems connected through a computer communication network so that the computer readable code is stored and executed in a distributed fashion.

It should be understood that although the present invention has been described above in detail with reference to the accompanying drawings and exemplary embodiments, this is illustrative only and various modifications may be made without departing from the spirit or scope of the invention. Thus, the scope of the present invention is to be determined by the following claims and their equivalents, and shall not be restricted or limited by the foregoing detailed description.

What is claimed is:

1. A method of aligning a position of a camera in a multi-camera system photographing multi-images, the method comprising:
    defining a correspondence relation between a plurality of images photographed in the multi-camera system;
    estimating respective initial positions of the camera and a three-dimensional point using the correspondence relation between the plurality of images and a Structure From Motion (SFM) algorithm;
    determining projected two-dimensional points by projecting the three-dimensional point onto first and second images among the plurality of images, respectively, the first and second images including respective original two-dimensional points;
    determining Euclidean distances between the projected two-dimensional points and the original two-dimensional points of the first and second images, respectively; and
    when a sum of the Euclidean distances is less than or equal to a reference value, generating an optimal edge using a bundle edge that connects a first vertex corresponding to the first image and a second vertex corresponding to the second image, and correcting the position of the camera based on the optimal edge.

2. The method of claim 1, wherein defining the correspondence relation comprises generating a graph including a plurality of vertices and a plurality of edges, the plurality of vertices corresponding to the plurality of images, and each of the edges representing a relation between the plurality of images,
    wherein the plurality of vertices includes the first and second vertices.

3. The method of claim 1, wherein defining the correspondence relation comprises:
extracting feature points from the first image and the second image;
comparing the feature point of the first image with the feature point of the second image to calculate a number of valid correspondences between the first and second images; and
if the number of valid correspondences is greater than a preset threshold, generating an edge between the first vertex and the second vertex.

4. The method of claim 2, wherein
the bundle edge connects the first vertex and the second vertex when an edge between the first vertex and the second vertex defined in the graph is broken as a result of the estimation of the initial position of the camera.

5. The method of claim 2, wherein
the bundle edge connects the first vertex and the second vertex when an edge between the first vertex and the second vertex defined in the graph is not connected as a result of the estimation of the initial position of the camera.

6. The method of claim 1, wherein correcting the position of the camera comprises:
(a) calculating the three-dimensional point, the three-dimensional point being shared by the first and second vertices, the first and second vertices being connected to the optimal edge;
(b) calculating camera parameter information for each of the first and second images using the three-dimensional point;
(c) calculating the sum of the Euclidean distances between the projected two-dimensional points and the original two-dimensional points of the first and second images, respectively using the camera parameter information; and
(d) recursively performing operations (a) to (c) until the sum of the Euclidean distances is equal to or less than the preset threshold.

7. The method of claim 1, further comprising:
generating, when the sum of the Euclidean distances is greater than the reference value, a first optimal edge connected to the first vertex and a second optimal edge connected to the second vertex.

8. The method of claim 7, wherein the generating comprises:
when the sum of the Euclidean distances is greater than the reference value, disconnecting the bundle edge that connects the first vertex and the second vertex, generating the first optimal edge and the second optimal edge, and correcting the position of the camera based on the first optimal edge and the second optimal edge.

9. An apparatus for aligning a position of a camera in a multi-camera system photographing multi-images, the apparatus comprising:
at least one processor; and
a non-volatile memory configured to store a code executed by the processor,
wherein the processor is implemented to:
define a correspondence relation between a plurality of images photographed in the multi-camera system;
estimate respective initial positions of the camera and a three-dimensional point using the correspondence relation between the plurality of images and a Structure From Motion (SFM) algorithm; and
determine projected two-dimensional points by projecting the three-dimensional point onto first and second images among the plurality of images, respectively, the first and second images including respective original two-dimensional points;
determine Euclidean distances between the projected two-dimensional points and the original two-dimensional points of the first and second images, respectively; and
when a sum of the Euclidean distances is less than or equal to a reference value, generate an optimal edge using a bundle edge that connects a first vertex corresponding to the first image and a second vertex corresponding to the second image, and correct the position of the camera based on the optimal edge.

10. The apparatus of claim 9, wherein the processor is implemented to define the correspondence relation by generating a graph including a plurality of vertices and a plurality of edges, the plurality of vertices corresponding to the plurality of images, and each of the plurality of edges representing a relation between the plurality of images,
wherein the plurality of vertices includes the first and second vertices.

11. The apparatus of claim 10, wherein
the bundle edge connects the first vertex and the second vertex when an edge between the first vertex and the second vertex defined in the graph is broken as a result of the estimation of the initial position of the camera.

12. The apparatus of claim 10, wherein
the bundle edge connects the first vertex and the second vertex when an edge between the first vertex and the second vertex defined in the graph is not connected as a result of the estimation of the initial position of the camera.

13. The apparatus of claim 10, wherein the processor is implemented to generate, when the sum of the Euclidean distances is greater than the reference value, a first optimal edge connected to the first vertex and a second optimal edge connected to the second vertex.

14. The apparatus of claim 13, wherein the processor is implemented to, when the sum of the Euclidean distances is greater than the reference value, disconnect the bundle edge that connects the first vertex and the second vertex, generate the first optimal edge and the second optimal edge, and correct the position of the camera based on the first optimal edge and the second optimal edge.

* * * * *